United States Patent [19]

Ljung et al.

[11] 4,277,173
[45] Jul. 7, 1981

[54] RING LASER GYROSCOPE DITHER DRIVE CIRCUIT

[75] Inventors: Bo H. G. Ljung, Wayne; Lincoln S. Ferriss, Lincoln Park, both of N.J.

[73] Assignee: The Singer Company, Little Falls, N.J.

[21] Appl. No.: 71,611

[22] Filed: Aug. 31, 1979

[51] Int. Cl.³ .............................................. G01C 19/64
[52] U.S. Cl. ................................................. 356/350
[58] Field of Search ............................... 356/350, 351

[56] References Cited

U.S. PATENT DOCUMENTS 4,132,482  1/1979  Friedland ............................ 356/350

*Primary Examiner*—Vincent P. McGraw
*Attorney, Agent, or Firm*—James C. Kesterson; Thomas W. Kennedy

[57] ABSTRACT

A method and apparatus for phase locking the dither motions of a set of ring laser gyroscopes are shown. To prevent a variation of force from existing on a strapped-down sensor block having a plurality of ring laser gyroscopes means are provided permitting only one gyroscope to determine the frequency of oscillation of its dither suspension system. The remaining gyroscopes are slaved in both frequency and phase to the reference rather than acting independently, or locked in frequency only. The circuitry for the master and slave units have similar components, and operate substantially the same except that the signal from the variable frequency oscillator of the master unit is used as the second input to the phase detectors of the slave units rather than them using the output of their own variable frequency oscillators.

10 Claims, 2 Drawing Figures

RING LASER GYROSCOPE DITHER DRIVE CIRCUIT

BACKGROUND OF THE INVENTION

This invention relates to ring laser gyroscopes in general and more particularly to new and novel circuitry for providing phase lock between the dither drive motion of the master and slave units as well as phase lock between the dither drive motion and the motion imparted by the path length controller drivers.

Because of the complex requirements of today's military and space flight equipment, greater and greater demands are being placed on such equipment as guidance systems. Since gyroscopes represent an essential part of most such systems, these stringent demands are also required of the gyroscope itself. Therefore, over the years many types of gyroscopes have been developed to meet there increasing demands. One sophisticated modern type gyroscope is referred to as "a ring laser gyroscope". As is inherent in its name, the ring laser gyroscope uses laser beams with travel in a closed path. Regardless of whether the closed path is triangular, square, octagonal, etc., the closed path is commonly referred to as a ring. Such a ring laser gyroscope is used to detect rotation about the axis of the path around which the laser beam travels. Typical ring laser gyroscopes are disclosed in U.S. Pat. Nos. 3,373,650 and 3,467,472.

These gyroscopes include a triangular block into which is bored a triangular-shaped cavity defined by mirrors at the three corners. It will be appreciated that the triangular cavity is preferred since it requires a minimum number of mirrors. The laser cavity itself is filled by a gas which comprises, for example, helium and neon. Through proper choice of the ratios of the neon isotopes in the gas mixture, two monochromatic laser beams are created. The two laser beams travel in opposite directions around the triangular cavity in the same closed optical path.

With no angular motion about the input axis of the ring laser gyroscope, the lengths of the two laser beams are equal, and the two optical frequencies are the same. Angular motion causes an apparent increase in the cavity length for the beam traveling in the direction of such angular movement and a corresponding decrease for the beam traveling in the opposite direction. Because the closed optical path is a resonant cavity providing sustained oscillation, the wave length of each beam must also be increased or decreased and therefore each beam frequency changes accordingly. Thus, a frequency differential occurs between the two beams which is proportional to the angular rate.

According to certain prior practices, the two beams are extracted from the laser at its output mirror and they are heterodyned in a beam combiner to produce an interference pattern. The interference pattern is detected by a photodetector which senses the difference frequency of the two beams, this frequency being a measure of the angular rate.

It is not uncommon, that at low angular rates, the frequency differential between the two beams is so small that the beams tend to resonate together, or "lock in" so that the two beams oscillate at only one frequency. If this occurs it is impossible to read the change in the angular rate because the frequency differential proportional to the angular rate does not exist. The angular rate below which "lock in" occurs is termed the lock-in rate. One means to reduce lock-in effects is to apply a sinusoidal input rate which is many times the lock-in rate, thus preventing lock-in except for short periods of time when the instantaneous sinusoidal input rate is less than the lock-in rate. This sinusoidal rate, commonly referred to as "dither" is typically imparted to the ring laser gyroscope by means of a PZT (Piezoelectric-Transducer) attached to the flexible suspension supporting the ring laser gyroscope block. These PZT's are typically driven by signals having a random component as well as a sinusoidal component.

The flexible suspension supporting the ring laser gyroscope block forms a resonant system having a resonant frequency of typically 250 Hz and a Q value which can vary from less than 100 to several hundred. Those skilled in the art recognize the desirability of providing dither drive at the resonant frequency of the dither suspension system in order to achieve the required dither motion with the least amount of drive energy. This can be done by connecting the dither suspension system in an oscillator loop wherein it becomes the element which determines the frequency of oscillation of the dither system. One or more PZT's connected to the system provide a signal at the frequency of oscillation to an amplifier which in turn drives other PZT's to sustain the oscillation.

In a system comprising three or more ring laser gyroscopes each could be so configured to independently oscillate at the resonant frequency of its dither suspension system. However, due to small differences in the tolerances of the parts which make up the dither suspension system, the resonant frequencies and their variations with temperature result in frequencies of oscillation which differ by small amounts among the ring laser gyroscopes. This produces beat frequencies and low frequency vibrations which are coupled among the ring laser gyroscopes adversely affecting performance. It is desirable, therefore, to synchronize the dither motions of all the ring laser gyroscopes.

According to one technique in the prior art, one of the three ring laser gyroscopes which typically make up a ring laser gyroscope system is selected as a master unit and provides an a-c frequency reference signal to the other two units which act as slave units, thus determining the frequency of oscillation of all three. However, a mechanical coupling exists between the dither motion of each of the ring laser gyroscopes due to the finite weight and suspension stiffness of the support block and unfortunately small changes in that stiffness and damping is believed to be the cause of undesirable phase shifts among the dither motions of the ring laser gyroscopes. Since the prior art dither drive circuitry simply provides an a-c frequency reference signal, such prior art systems do nothing to alleviate this serious problem.

Therefore, to overcome the shortcomings of presently available methods and apparatus, it is an object of this invention to provide methods and apparatus for phase locking the dither motion of the separate ring laser gyroscopes comprising a system.

It is still another object of this invention to provide inexpensive and simple circuitry for generating dither motion.

It is a further object of this invention to provide circuitry for locking in phase the path length control motion of a ring laser gyroscope with the dither motion.

To accomplish the above mentioned objects as well as other objects which will become evident from the following drawings and detailed description, the present invention provides circuitry for use with a ring laser gyroscope system having a multiplicity of ring laser gyroscope units wherein one of the ring laser gyroscopes is selected to operate as the master unit and the remaining units are selected to operate as slave units to provide phase lock between the dither drive motion of the master unit and the slave units.

The circuitry includes a multiplicity of circuits, one each for use with one each ring laser gyroscope, each of the circuits comprising a means for sensing the dither motion of its respective ring laser gyroscope and for providing an electrical dither signal representative of such dither motion. A dither signal is provided to a phase detector which in turn provides a phase difference output signal which varies in response to said dither signal and a control signal. The phase difference signal is provided to a variable oscillator which also receives a random input noise signal in turn provides a drive signal having a frequency which varies in response to the random input signal and the phase difference signal. The drive signal is provided to a means for imparting the dither motion to an appropriate ring laser gyroscope such that the dither motion varies in response to the applied drive signal. The drive signal provided by the ring laser gyroscope selected to be the master signal is also connected to each of the phase detectors to act as the control signal for the slave units. Thus, it can be seen that the dither motion of each of the ring laser gyroscopes will be in phase lock with the drive signal provided by the circuitry corresponding to the master unit.

Accordingly, the above mentioned objects and subsequent description will be more readily understood by reference to the following drawings wherein.

Figure 1:
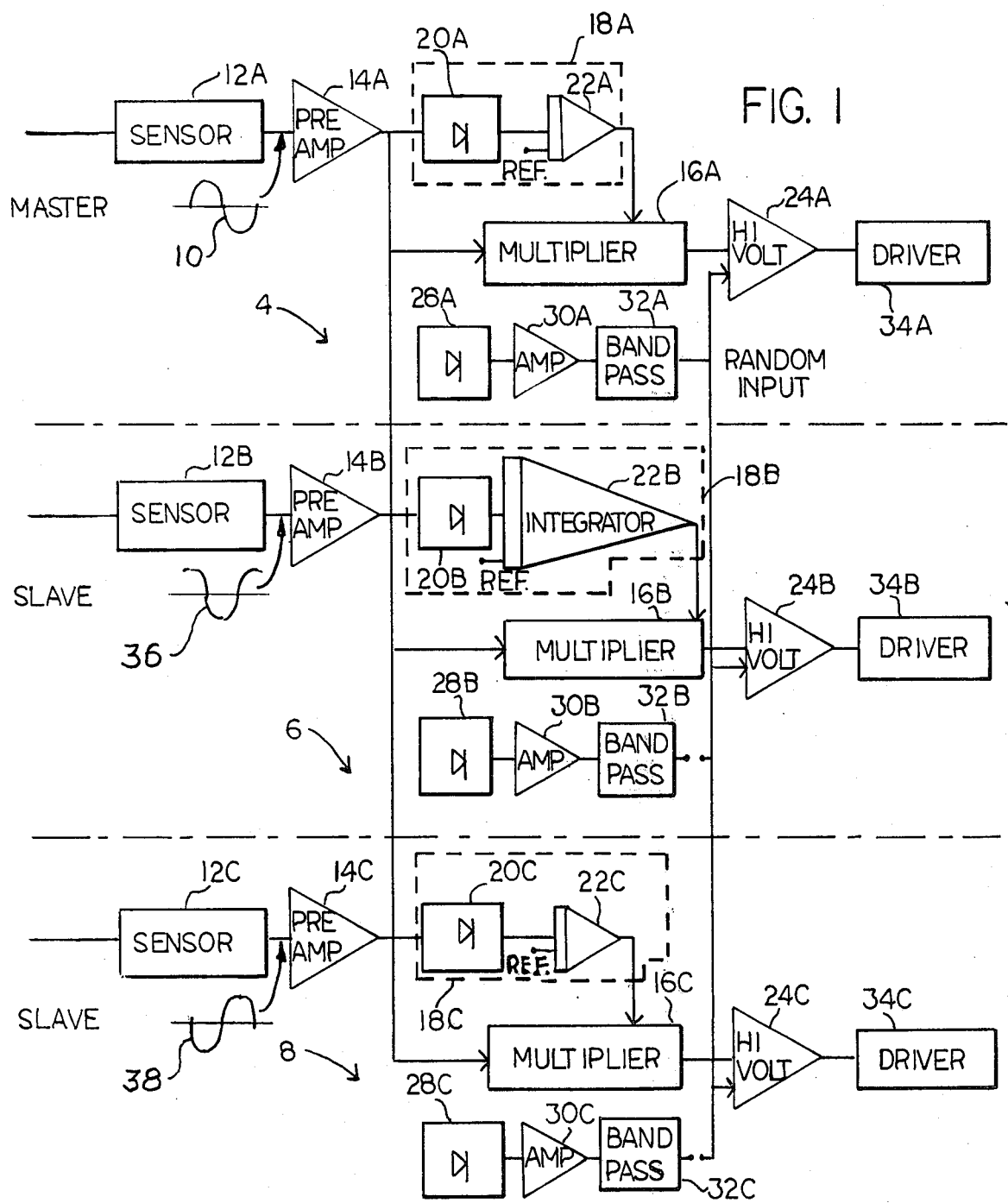
FIG. 1 is a block diagram of prior art circuitry used for providing dither motion.

Referring now to FIG. 1 there is shown a block diagram schematic of a prior art technique of driving two slave ring laser gyroscopes by a master ring laser gyroscope which uses common excitation and independent AGC (Automatic Gain Control). Although in this prior art illustration circuitry for three ring laser gyroscopes 4, 6 and 8 is shown, it will be appreciated that this technique is equally applicable to four or even more gyroscopes which operate in a master-slave relationship. According to this prior art embodiment, a substantially sinusoidal input signal 10 is generated by sensor 12A. Generated signal 10 is representative of dither motion imparted to the ring laser gyroscope system to prevent frequency lock-in of the contra-rotating laser beams. As was discussed heretofore, such a frequency lock in would result in an inability to sense small angular rates. Ring laser gyroscopes manufactured by the assignees of this invention typically exhibit dither resonance frequencies of approximately 250 Hz for the purpose of ameliorating lock-in effects. However, it will be appreciated that the present invention is not limited to systems utilizing ring laser gyroscopes having 250 Hz dither resonance frequencies since that resonance frequency can vary by design. The signal 10 generated by sensor 12A is then provided to preamplifier 14A. The output from preamplifier 14A is then split and one path is provided to multiplier 16A and the other paths are provided to multipliers 16B and 16C of slave units 6 and 8, respectively, thus providing a dither reference signal at a single frequency for master and slave units. In effect this interconnection provides that all dither motion occurs at the reference frequency generated by the resonant dither motion of the gyroscope designated as the master. The output of AGC circuitry 18A is provided to multiplier 16A. Although AGC circuitry 18A may consist of any suitable automatic gain control circuitry presently available, the prior art embodiment of this example uses a precision rectifier diode 20A which provides a signal to an integrating circuit 22A.

Another input to the integrator 22A is a dc reference voltage. The output of the integrator is proportional to the time integral of the difference between the rectified output of preamp 14A and the reference voltage. This output is used as a dc control signal applied to multiplier 16A. The multiplier 16A serves as an amplitude control element providing an output to high voltage amplifier 24A which has a phase and frequency equal to the output of preamp 14A but which has an amplitude proportional to the value of the reference voltage. The circuitry comprising diode 20A, integrator with voltage reference 22A and multiplier 16A form an automatic gain control loop of a type which has zero amplitude error. That is, the steady-state input amplitude of the dither sinusoid from preamp 14A is fixed in value and proportional to the value of the voltage reference. To further reduce the effects of lock-in, high voltage amplifier 24A also includes a second input on line 26A, which input is a random signal generated by a noise diode 28A and amplified by amplifier 30A. The output from amplifier 30A is then provided to a band pass filter 32A which limits the upper and lower frequencies such that the random noise is within a particular bandwidth. Thus, the two inputs to high voltage amplifier 24A are amplified providing an output to the piezoelectric transducer driver 34A. Piezoelectric transducer driver 34A in turn provides motion to the ring laser gyroscope to surpress lock-in. This motion is represented by signal 10 which is picked up by sensor 12A. Then, it can be seen that there is a closed loop system for providing the dither motion.

In addition to the closed loop system just discussed, which in this embodiment is master unit 4, there are also two slave units 6 and 8. As is seen by referring to the diagram, the slave units 6 and 8 have components substantially identical to those of the master unit 4. These units are simply shown in the diagram for purposes of illustrating the normal manufacturing procedure of making all three of the ring laser gyroscopes identical so that any one can be selected to serve as the master unit. As will be apparent, by simple interconnections among the circuitry, the master unit could be made a slave unit and either of the slave units be turned into the master unit.

In this prior art represented by FIG. 1, the frequency of dither oscillation is determined by the master unit because the output of preamp 14A is fed to not only the master unit signal circuit (input to multiplier 16A) but also to the slave units signal circuitry (inputs to multipliers 48B and 48C).

The relative phases of dither motion among the ring laser gyro's is dependent upon the resonant frequencies and the quality factors of those resonances of the respective RLG dither mechanisms. No control circuitry is provided to maintain relative phases of dither motion equal to zero, and therefore net moments applied to the sensor block upon which the RLG's are mounted are less likely to be constant and controlled.

In addition, to further illustrate the lack of phase lock in the prior art dither drive circuitrys, it can be seen that the signals 36 and 38 received by pick-ups 12B and 12C of slave units 6 and 8 respectively are illustrated as being out of phase even though the same frequency.

Figure 2:
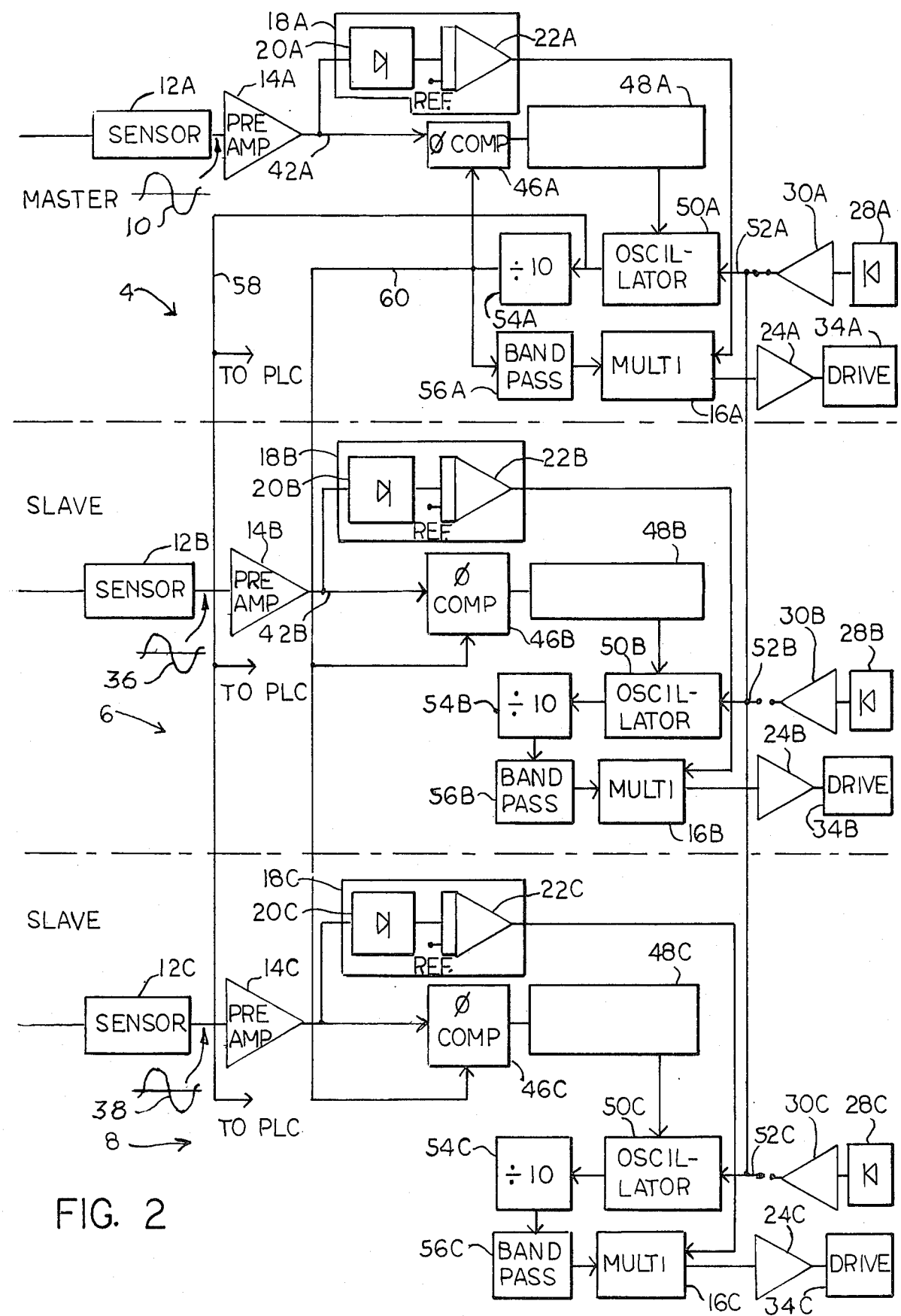
FIG. 2 is a block diagram of the circuitry of the present invention for providing the phase locked dither motion.

Referring now to FIG. 2, there is shown block diagram circuitry of the present invention for providing the dither motion to the three units of a ring laser gyroscope wherein the dither motion is phase locked among the three units. This is represented by the signals 10, 36 and 38 of the master unit 4 and the slaves 6 and 8 respectively being shown as being in phase and of the same frequency. Since the present invention uses some components which were also used in the prior art circuitry, these components which are similar in nature and in operation to that used in the prior art are represented by the same reference number as their companion units in FIG. 1.

Thus, according to this invention signal 10 generated by the sensor 12A of master unit 4 is provided to preamplifier 14A. The output of preamplifier 14A is split and one path is provided to the automatic gain control circuitry 18A as occurred in the prior art.

Another branch of the output of preamplifier 14A is provided to one input of phase detector 46A. As will be discussed in detail hereinafter, the other input to phase detector 46A is provided by circuitry. It has been found desirable to include stabilizing network and filter 48A in the circuitry. This circuitry determines the type of the phase-locked loop system and controls overshoot and settling time. Variable frequency oscillator 50A also receives a random noise signal on line 52A which is generated by noise diode 28A and amplified by amplifier 30A. Thus, the frequency of the square wave provided by the variable frequency oscillator 50A is controlled by the combined effects of the signal from phase detector 46A and the random signal received on line 52A. It should also be noted that since the noise generated by noise diode 28A and amplifier 30A is "phase" noise in the phase lock circuitry of this invention, this portion of the circuitry will continue to operate effectively even if amplifier 30A is saturated. In the embodiment shown, the output of the variable oscillator 50A is provided to a "Divide by 10" circuit 54A. Thus, a signal having a frequency one tenth of that provided by the variable frequency oscillator 50A is provided to phase detector 46A and as will be discussed later is used to drive the dither motion transducer motor. Thus, it can be seen that phase detector 46A receives a square wave from comparator 40A and from the "Divide by 10" circuit 54A . These two square waves are compared to determine phase difference between the two signals. If a phase difference exists, the output from phase detector 46A which is applied to the variable frequency oscillator 50A changes the output frequency of variable frequency oscillator 50A until the two signals are back in phase. In addition, the output from "Divide by 10" circuit 54A is also applied to a band pass filter 56A. In addition to the usual task of a band pass filter to limit signals passing through to selected frequencies, band pass filter 56 in this embodiment also has the effect of limiting the rise and fall time of the square wave signal received from multiplier 54A. Consequently, the edges of the square wave are rounded off such that the output of the band pass filter 56A has substantially a sinusoidal shape. The output of band pass filter 56A is applied to multiplier 16A which functions as the amplitude control element in a manner identical to the corresponding elements of the circuit of FIG. 1. Prior to being applied to the piezoelectric motor 34A, the signal is amplified by high voltage amplifier 22A as also occurred in the prior art.

It will be appreciated by those skilled in the art, the use of the "Divide by 10" circuit 54A is not necessary and that instead the output of the variable frequency oscillator 50A could provide a frequency which is only one-tenth of that provided by the circuitry described in FIG. 2. However, the output of the variable frequency oscillator 50A can be used by the pathlength controller circuitry which operates at a frequency typically ten times that of the dither motion and thereby also provides phase lock between the dither motion, and the motion provided by the pathlength controller circuitry. It should be noted that the output on line 58 is provided to the pathlength controller circuitry for ring laser gyroscope master unit 4 as well as ring laser gyroscope slave units 6 and 8.

The signal provided to phase detector 46A and band pass filter 56A is also provided by line 60 to the phase detectors 46B and 46C of the slave ring laser gyroscopes 6 and 8 respectively. It is seen, that the slave ring laser gyroscope circuitry 6 and 8 is the same as that described with respect to ring laser gyroscope 4 except that the second input to phase detectors 46B and 46C is the output from the "Divide by 10" circuitry 54A.

Thus, slave ring laser gyroscope circuitry 6 and 8 are supplied with the same frequency and phase reference signal that operates the phase detector circuit 46A of the master circuitry. The manner by which phase locking is achieved can be described as follows.

The master circuitry functions to force the input from preamp 14A to phase detector 46A to exhibit zero phase error with the phase reference signal 60. If, due to temperature changes or for other reasons, the resonant frequency of the dither suspension system of one or both of the slave RLG's changes, an effect would be to cause a phase change in the signal picked up by the sensor associated with that RLG, say sensor 12B. Thus, a phase difference would exist at the input of phase comparator 46B. An output would be generated which, after filtering by circuit 48B is applied to voltage-controlled oscillator 50B. The phase of the VCO output would begin to change causing that dither suspension system to shift operating conditions on the resonance curve to cause the output of sensor 12B to return to zero phase difference with respect to the phase reference on 60. The frequency of oscillation before the resonant frequency change equals the frequency of oscillation after the resonant frequency change.

If the resonant frequency of the dither suspension system of the master RLG changes, the frequency of oscillation would also change to force a null phase difference at the input to phase detector 46A. The frequency change would force the slave circuits to change frequency also, forcing changes of operating points on their resonance curves to accommodate both the frequency change and the condition of phase detector nulls within their loops. Thus, it can be seen that according to this invention the two slave ring laser gyroscopes 6 and 8 are in phase lock with the master ring laser gyroscope 4.

Thus, it can be seen, that the circuitry elements and the method of operation of the slave ring laser gyroscopes 6 and 8 are substantially similar to that of the master ring laser gyroscope 4. As was the case in the prior art, the slave circuits are fabricated identical to the master circuit so that by a simple change in connections, either of the slaves can become the master and the master the slave. As was also the case in the prior art, there are therefore circuit components that are not used unless the particular unit is to act as the master. Consequently, noise diodes 28B and 28C and amplifiers 30B and 30C will not be used unless it is desired that one of the slave units be the master.

Although the present invention has been described with respect to specific methods and apparatus for providing phase lock dither motion between the slave units and the master units in a ring laser gyroscope, it is not intended that such specific references be considered limitations upon the scope of the invention except insofar as is set forth in the following claims.

What is claimed is:

1. In a gyroscope system having a multiplicity of ring laser gyroscopes, wherein one of the ring laser gyroscopes is selected to act as the master unit and the remaining ring laser gyroscopes are selected to act as slave units, circuitry for providing phase lock between the dither drive motion of the master unit and the slave units comprising:

a multiplicity of circuits, one each for use with one each ring laser gyroscope, each of said circuits comprising:

means for sensing the dither motion of its respective ring laser gyroscope and for providing an electrical dither signal representative of said dither motion, phase detection means having a dither signal input port for receiving said dither signal and a reference signal input port for receiving a reference signal, said phase detection means also having a phase difference output port for providing a phase difference signal representative of the phase difference between said dither signal and said reference signal, a variable frequency oscillator having a drive signal output port for providing a drive signal, said oscillator having a phase difference signal input port for receiving said phase difference signal and a random signal input port for receiving a random input signal, the frequency of said output drive signal varying in response to changes in said phase difference signal and said random input signal, drive means for receiving said drive signal and for imparting dither motion to said respective ring laser gyroscope in response to said drive signal, means for providing said random input signal to each of said master and slave units;

means for connecting the drive signal output port of said ring laser gyroscope selected as said master unit with the reference signal input port of said master unit such that said drive signal of said master unit is said reference signal; and means for connecting said drive signal output port of said master unit to the reference signal input port of each of the ring laser gyroscopes selected to be slaves such that the drive signal of said master unit is said reference signal applied to each of said slave units whereby the signals at each dither signal port are in phase with the said reference signal and hence are in phase with themselves.

2. The circuitry of claim 1 wherein each of said ring laser gyroscope units further include automatic gain control circuitry for maintaining the amplitude of its respective drive signal at a constant level.

3. The circuitry of claim 2 wherein said automatic gain control circuitry includes:

means connected to the output of said sensing means for receiving said dither signal and for providing a rectified dither signal;

integrating circuit means for receiving said rectified dither signal and a reference signal, and for providing an amplitude control signal, and combining circuitry connected between the drive signal output port of said variable oscillator and said drive means, said combining means also receiving and amplitude control signal whereby the amplitude of said drive signal applied to said drive means varies in response to said amplified control signal.

4. In a gyroscope system having a multiplicity of ring laser gyroscopes wherein one of the ring laser gyroscopes is selected to act as the master unit and the remaining ring laser gyroscopes are selected to act as slave units, circuitry for providing phase lock between the dither drive motion of the master unit and the slave unit comprising:

a multiplicity of circuits, one each for use with one each ring laser gyroscope, each of said circuits comprising:

means for sensing the dither motion of its respective ring laser gyroscope and for providing an electrical dither signal representative of said dither motion, phase detection means having a dither signal input port for receiving said dither signal and a reference signal input port for receiving a control signal, said phase detection means also having a phase difference output port for providing a phase difference signal representative of the phase difference between said dither signal and said control signal, a variable oscillator having a drive signal output port for providing a drive signal, said oscillator having a phase difference signal input port for receiving said phase difference signal and a random signal input port for receiving a random input signal, said drive output signal having a frequency which is a selected multiple of the frequency of said dither motion and which varies in response to changes in said phase difference signal and said random input signal, dividing means having a drive signal input port for receiving said drive signal and a power drive signal output port for providing a power drive signal having a frequency substantially equivalent to said dither motion, drive means for receiving said power drive signal and for imparting dither motion to said respective ring laser gyroscope in response to said power drive signal;

means for providing said random input signal to each of said master and slave circuits;

means for connecting the power drive signal output port of said ring laser gyroscope selected as said master unit with the control signal input port of said master unit such that said drive signal of said master unit is said control signal; and means connecting said power drive signal output port of said master unit to the control signal input ports of each of the ring laser gyroscopes selected to be the slave units such that the power drive signal of said master unit is said control signal applied to each of said slave units whereby the power drive signals of said slave units are in phase lock with the power drive signals of said master units.

5. The circuitry of claim 4 wherein each of said ring laser gyroscope units further include automatic gain control circuitry for maintaining the amplitude of its respective drive signal at a constant level.

6. The circuitry of claim 5 and further comprising circuitry connected between said means for sensing and said phase detector for converting said dither signal from a substantially sinusoidal signal to a square wave signal.

7. The circuitry of claim 2 and further including stabilizing means connected between said phase detector and said variable oscillator to control the transient response characteristics of said phase difference signal prior to said signal being applied to said variable oscillator.

8. The circuitry of claim 1 and further comprising means for connecting the drive signal from said master unit to a pathlength controller drive system of each of said ring laser gyroscopes to provide phase lock between said dither motion and said pathlength controller motion.

9. In a method providing dither motion to a ring laser gyroscope system having a multiplicity of ring laser gyroscopes wherein one of said ring laser gyroscopes is selected to act as the master unit and the remaining ring laser gyroscopes are selected to act as slave units a method for providing phase lock between the dither motion of each of said ring laser gyroscopes comprising the steps of:

providing a multiplicity of circuits one each for use with one each of said multiplicity of ring laser gyroscopes;

sensing the dither motion of each ring laser gyroscope and providing an electrical dither signal representative of said dither motion for each of said ring laser gyroscopes;

detecting the phase difference between each of said dither signals and a control signal and providing a multiplicity of phase difference signals representative of the difference between each of said dither signals and said control signal;

generating a multiplicity of drive signals, each of said drive signals having a frequency varying in response to a random signal and one of said multiplicity of said phase difference signals;

providing said dither motion to each of said ring laser gyroscopes in response to a drive signal corresponding to each of said ring laser gyroscopes;

connecting said drive signal from said ring laser gyroscopes selected as said master unit to each of said ring laser gyroscopes selected as slave units such that said drive signal from said master is said control signal.

10. The method of claim 9 and further comprising the step of providing automatic gain control circuitry to each of said ring laser gyroscopes for maintaining the amplitude of its respective drive signal at a constant level.

* * * * *